(12) United States Patent
Karamihas et al.

(10) Patent No.: US 6,682,261 B1
(45) Date of Patent: Jan. 27, 2004

(54) METHOD FOR CORRECTING THE ROUGHNESS OF PAVEMENT

(76) Inventors: Steven M. Karamihas, 8902 Dexter-Gables La., Dexter, MI (US) 48130; Michael J. Swan, 6055 Wiclif Rd., NE., Canton, OH (US) 44721

( * ) Notice: Subject to any disclaimer, the term of this patent is extended or adjusted under 35 U.S.C. 154(b) by 0 days.

(21) Appl. No.: 10/278,650

(22) Filed: Oct. 23, 2002

Related U.S. Application Data

(60) Provisional application No. 60/335,940, filed on Oct. 23, 2001.

(51) Int. Cl.[7] .................................................. G01C 7/00
(52) U.S. Cl. ........................................................ 404/75
(58) Field of Search .............................. 701/50; 404/89, 404/91, 93, 94, 75

(56) References Cited

U.S. PATENT DOCUMENTS

| | | | | |
|---|---|---|---|---|
| 5,263,769 A | * | 11/1993 | Pharr et al. ................ 299/39.6 |
| 5,265,975 A | * | 11/1993 | Scott ............................ 404/94 |
| 5,362,177 A | * | 11/1994 | Bowhall et al. ............ 404/84.1 |
| 5,549,412 A | * | 8/1996 | Malone ...................... 404/84.1 |
| 5,766,333 A | * | 6/1998 | Lukens ........................ 106/280 |
| 5,791,814 A | * | 8/1998 | Wiley ........................... 404/91 |
| 5,864,970 A | * | 2/1999 | Maddock et al. .............. 37/94 |

* cited by examiner

*Primary Examiner*—Robert E. Pezzuto
*Assistant Examiner*—Raymond W Addie
(74) *Attorney, Agent, or Firm*—Young & Basile, P.C.

(57) ABSTRACT

A method for correcting roughness of pavement wherein the steps include measuring an elevation profile of the pavement, converting the elevation profile to a roughness profile, and identifying defective segments of the roughness profile as those areas of the profile exceeding a predetermined value. A grinder is simulated over the defective segments to provide a modified elevation profile. The modified elevation profile is converted to a modified roughness profile wherein corrected defective segments are identified as defective segments in the roughness profile that exceed the predetermined value in the modified roughness profile. A grinding operation is then applied to those areas of the pavement corresponding to the defective segments.

18 Claims, 9 Drawing Sheets

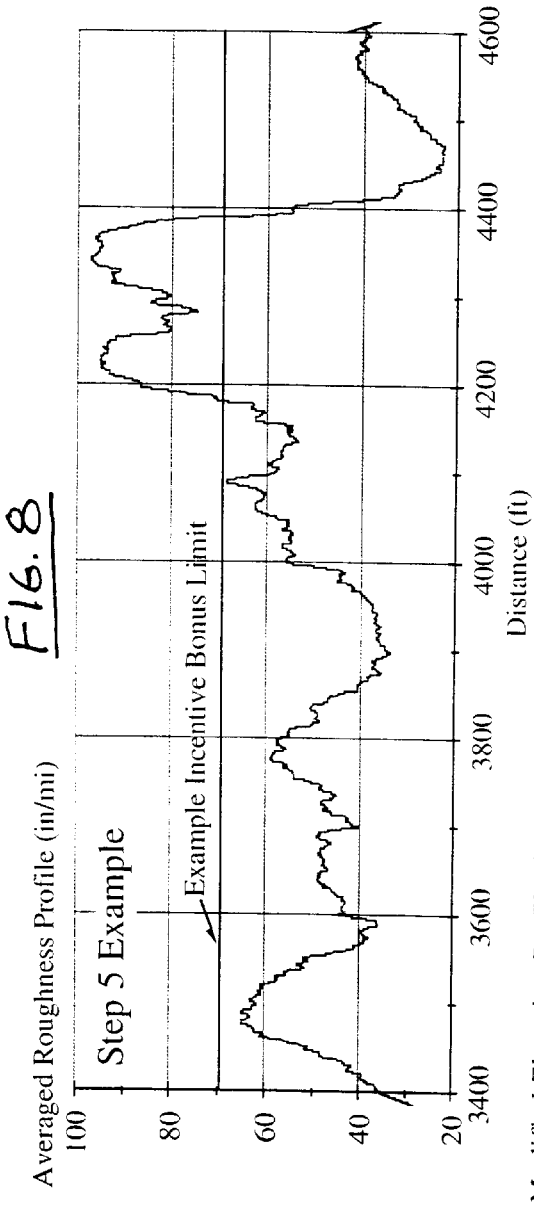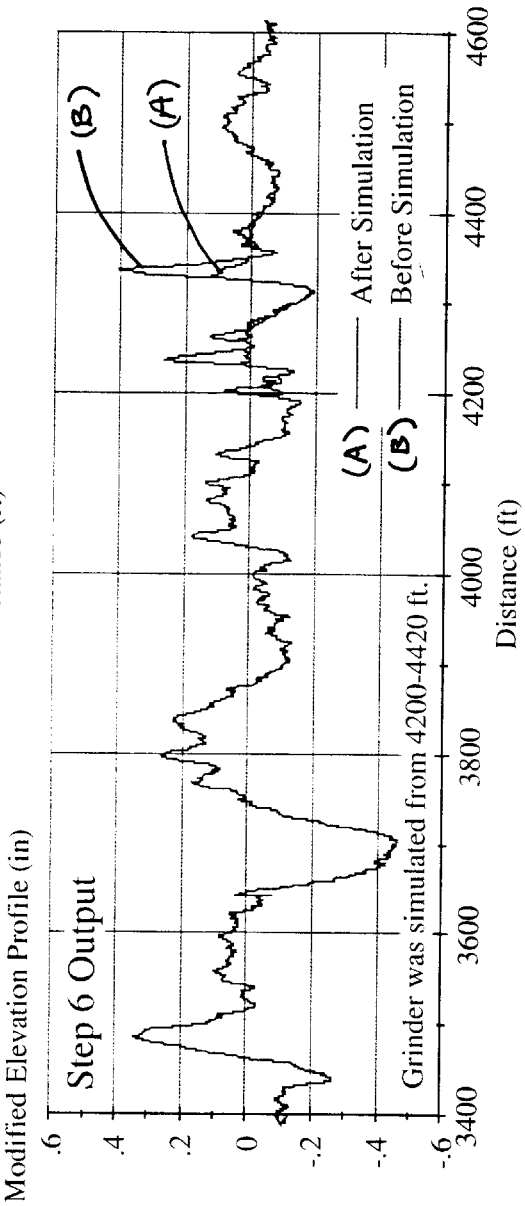

METHOD FOR CORRECTING THE ROUGHNESS OF PAVEMENT

This is a formalization of U.S. Provisional Patent Application Serial No. 60/335,940, filed Oct. 23, 2001.

FIELD OF THE INVENTION

The present invention relates to the field of paving, and in particular, to a method of simulating the grinding of pavement in order to determine the most effective and efficient means of grinding pavement.

BACKGROUND OF THE INVENTION

One of the most important measures of the quality of a newly paved road surface is smoothness, that is, the number and size of bumps and dips in the pavement. Smooth roads require less maintenance and conserve fuel. They also provide for a more comfortable ride. Because of the importance of smooth roads, most contractors must adhere to strict specifications concerning the smoothness of the roads they construct. A road which does not meet the specifications may result in the forfeiture of the part of the contract price or may require grinding or filling parts of the pavement, both of which are costly to the contractor. On the other hand, pavement which exceeds specifications for smoothness may result in bonus payments to the contractor. Thus, it is desirable to obtain smoothness data on a newly paved road to determine whether specifications are being met.

Several devices have been utilized for measuring the smoothness or roughness of new pavement construction. One such device is a profilograph, as seen in FIG. 1, which is utilized to create an elevation profile of the road. The profilograph is an elongated beam or frame supported on several wheels. The beam establishes a datum from which deviations in the road surface can be measured. A sensing wheel rolls on a surface and moves vertically as it travels over bumps and dips in the road. The output of a profilograph is a trace profilograph elevation response as a function of distance. Originally, profilographs were entirely mechanical devices which used a linkage to transmit the vertical movement of the sensing wheel to a pen which traced a plot of the road surface on a moving roll of paper. The profilograph plots the elevation of the surface as a function of distance traveled. Typically, a calibrated wheel is used to measure the distance. The roughness was summarized by applying a blanking band and accumulating the height of all protrusions outside the blanking band. The blanking band is effectively a tolerance under which the response is not accumulated. Often, locations for corrective action were simply the location where the blanking band was violated by more than a designated amount. Recently, the blanking band was eliminated in many applications, and proposed locations for grinding were simply the locations where a profilograph response reached a designated level.

Since grinders were built specifically to decrease profilograph response, choosing locations for grinding used in a profilograph was fairly simple. The geometry of a grinder was designed to be similar to a profilograph such that the grinder could follow the profile of the profilograph. Unfortunately, the rating a profilograph gives to pavement features has only marginal relevance to the perception a vehicle driver has when riding on the pavement. This prompted a move to the use of road profiling technology, usually referred to as inertial profilers, as seen in FIG. 2, for evaluation of new construction pavement.

The fundamental difference between profilers and profilographs is that profilographs measure the road with distortion, and profilers measure the road without distortion over the range of wavelengths that affect vehicle vibration response. The distortion of profilograph measurement is determined by its geometry. A trace from a profiler can then be distorted to rate the relevant wavelengths by a computer algorithm. Such computer algorithms allow for the computation of certain roughness indices such as the International Roughness Index (as seen in FIG. 3), Ride Number and Michigan Ride Quality Index.

Measurement of profile and use of a profile-based roughness index is a better way to rate the quality of new pavement, but they are only useful in practice if a method is available to locate and correct the rough spots. For now, pavement bump grinders are the only available tool to correct such rough spots. Because of the bump grinders' geometry, they do not necessarily improve the values in any of the roughness indices listed above. Therefore, a strategy is needed to guide the proper use of a grinder by choosing locations where grinding provides the best payoff. The economic consideration in the use of this method is the existence of incentive payments for achieving a given smoothness level on new pavement. Typically, state highway agencies that hire pavement contractors include incentive payments for each one-tenth mile-long segment of the new pavement that falls below a given roughness target level. Penalties are occasionally imposed per segment that is rougher than a limit roughness value. In a minority of cases, the incentive bonus structure is based on a graduated roughness scale.

Thus, it would be desirable to provide a quality and cost effective manner in which to correct the roughness of new pavement.

SUMMARY OF THE INVENTION

The present invention provides a method for correcting the roughness of pavement. The method includes the steps of measuring an elevation profile of the pavement and converting the elevation profile to a roughness profile. Defective segments are identified as areas of the roughness profile that exceed a predetermined value. A grinding operation is simulated over the defective segments of the roughness profile to create a modified elevation profile. The modified elevation profile is then converted to a modified roughness profile wherein corrected defective segments are identified as those defective segments in the roughness profile that are no longer considered defective segments in the modified roughness profile. The areas of the pavement corresponding to the defective segments are then ground to correct the defective segments in the pavement.

BRIEF DESCRIPTION OF THE DRAWINGS

The description herein makes reference to the accompanying drawings wherein like referenced numerals refer to like parts throughout several views and wherein:

FIG. 8 is an average roughness profile shown with a roughness limit.

FIG. 9 is a modified elevation profile created after simulated grinding.

DESCRIPTION OF THE PREFERRED EMBODIMENT

Figure 1:
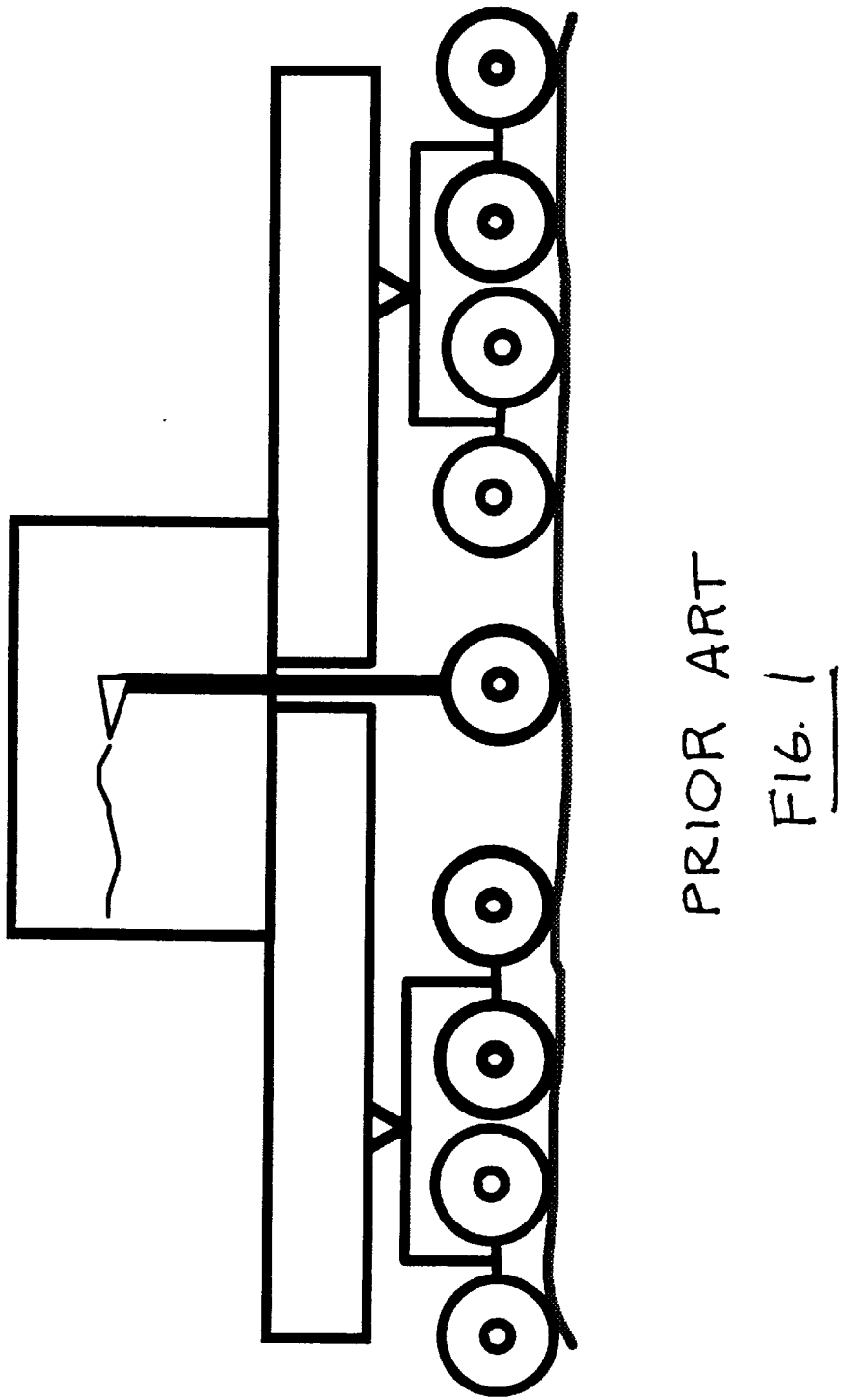
FIG. 1 is a schematic showing a profilograph of the prior art.

Referring to the drawings, the present invention will now be described in detail with reference to the preferred embodiment.

Figure 2:
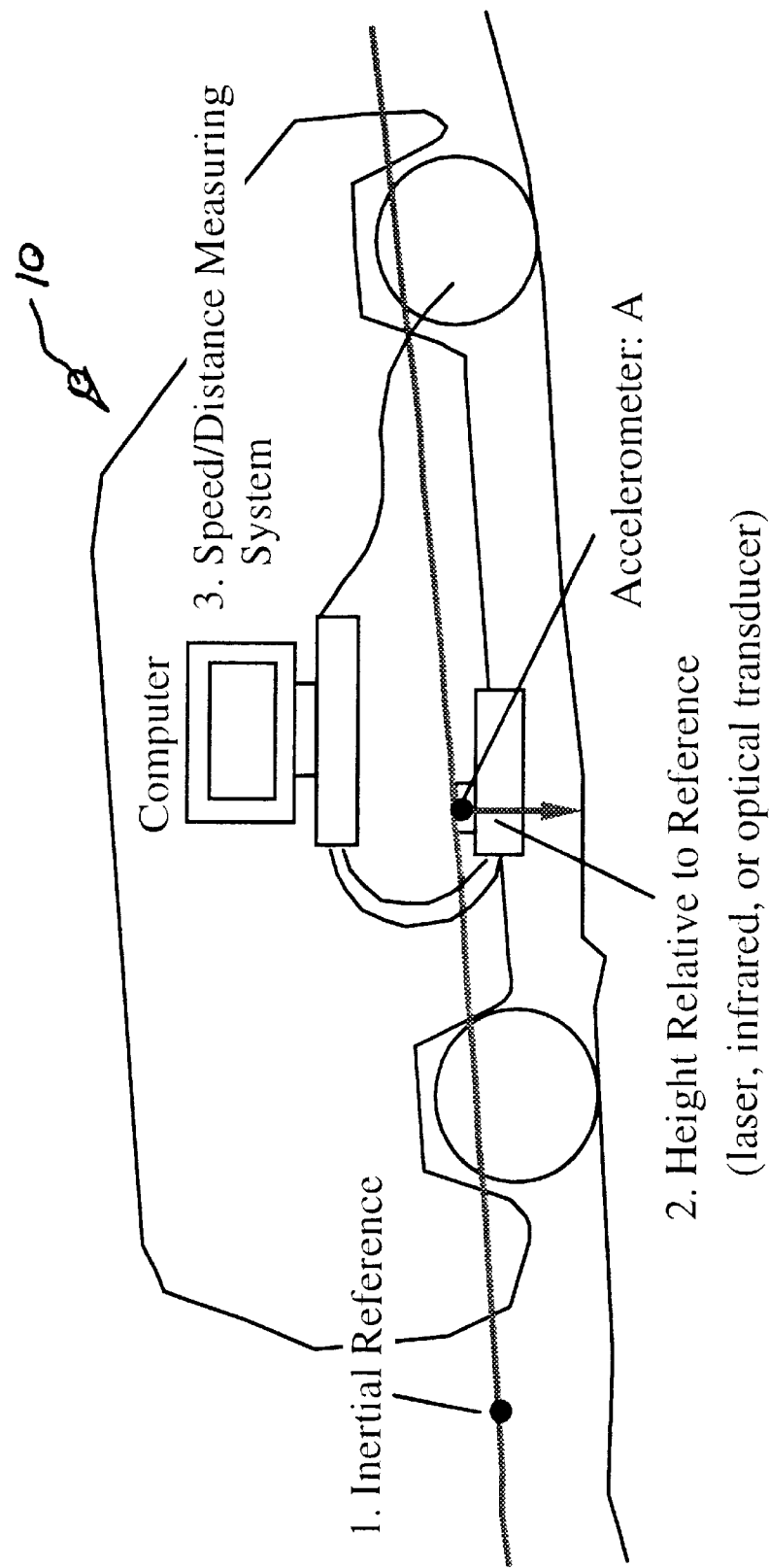
FIG. 2 is a schematic of an inertial profiler of the prior art.
Figure 3:
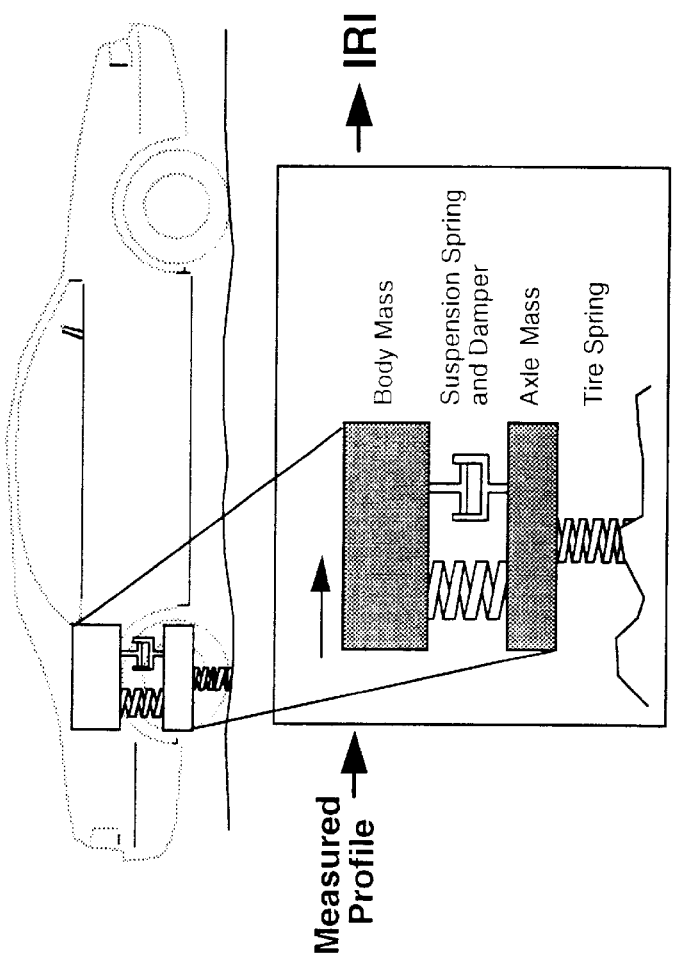
FIG. 3 is a schematic showing the elements involved in determining the International Roughness Index of the prior art.
Figure 10:
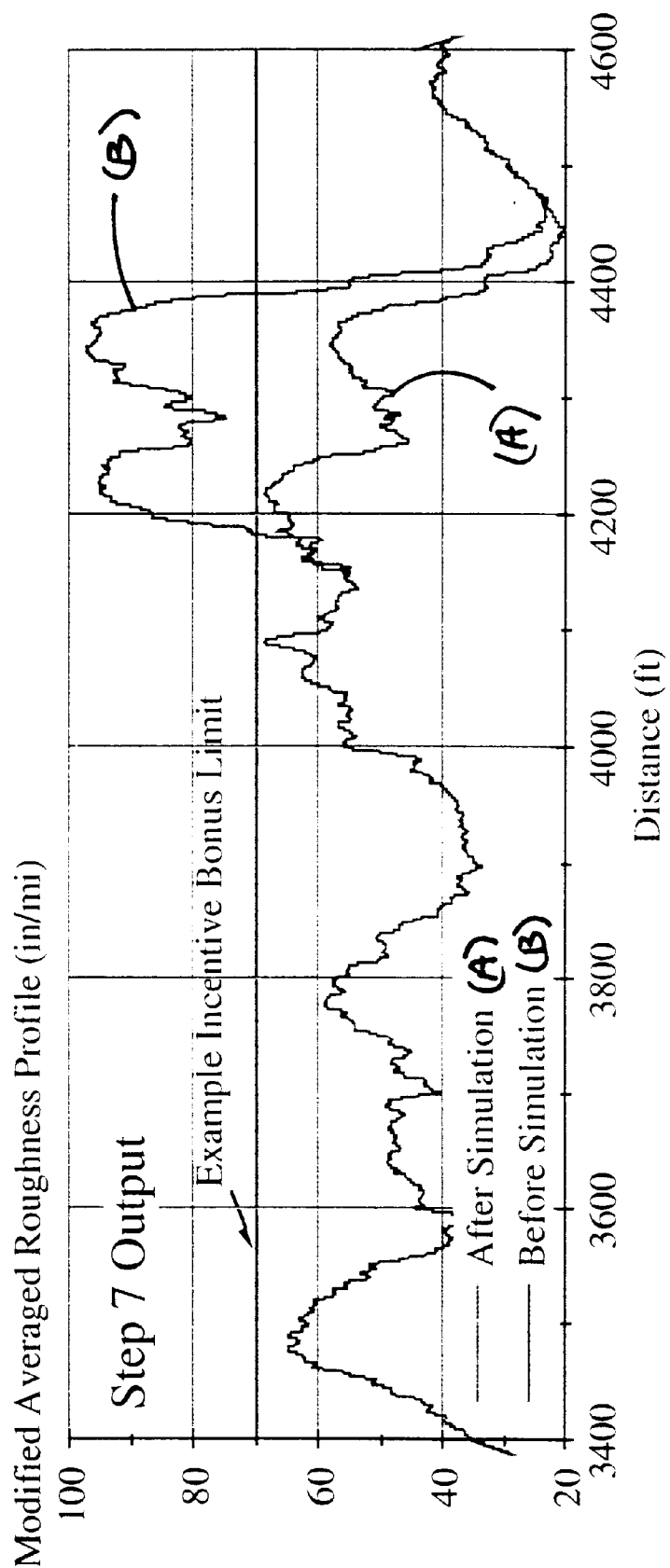
FIG. 10 is a modified average roughness profile after simulated grinding.
Figure 11:
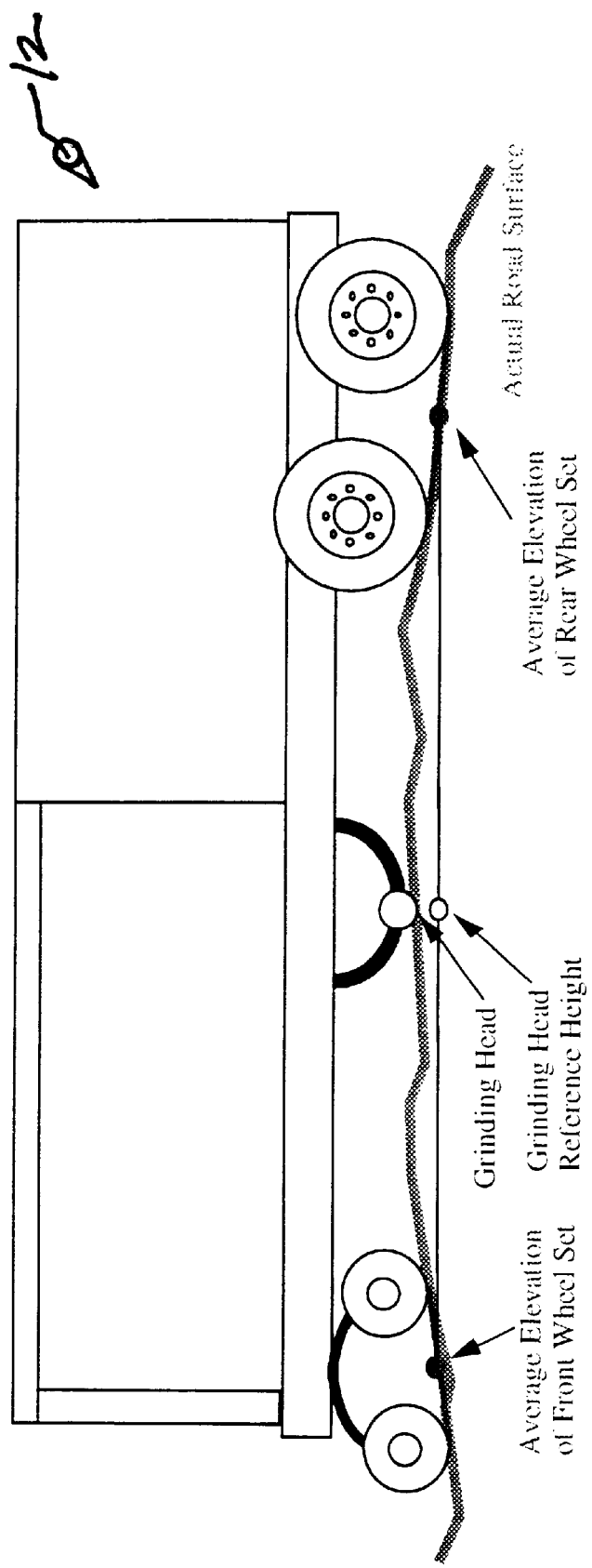
FIG. 11 is schematic of a grinder over a paved surface.
Figure 12:
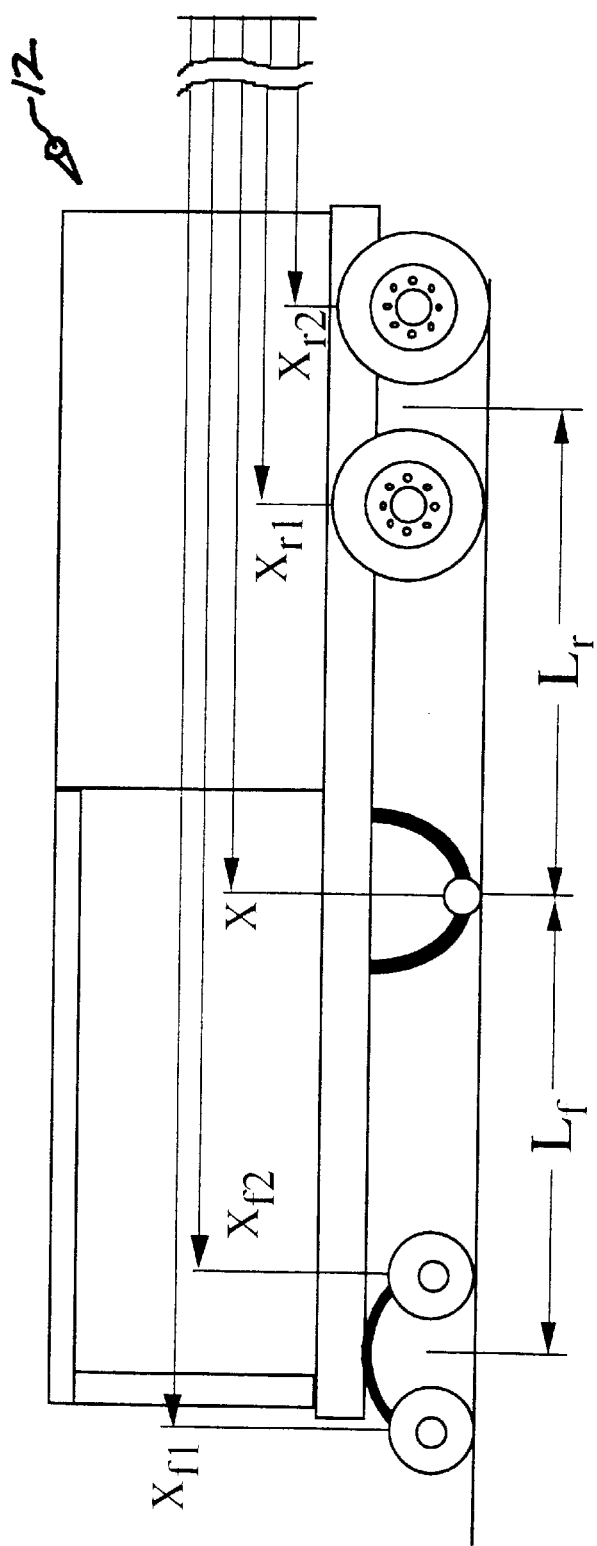
FIG. 12 is a schematic of a grinder with the parameters used in the algorithm for simulating the grinder.

FIGS. 4–12 illustrate the method of the present invention for correcting roughness of pavement for a road or other paving application. The method utilizes a road profiler 10, as shown in FIG. 2, and a pavement grinder 12, as shown in FIGS. 11 and 12, to minimize the roughness of new pavement. Although the method may be applied to any type of pavement, it is most commonly used in conjunction with new pavement since the method is targeted toward maximizing bonus payouts specified in road profile-based smoothness specifications. The method of the present invention requires that roughness be reported on a continuous basis, rather than in long segments, so that locations of roughness features that contribute most to roughness can be located. A grinder simulation is then used to decide if a grinder would lower the roughness values enough to be cost effective. In addition, the grinder simulation may determine the exact locations in which the grinder may be most effective.

Figure 4:
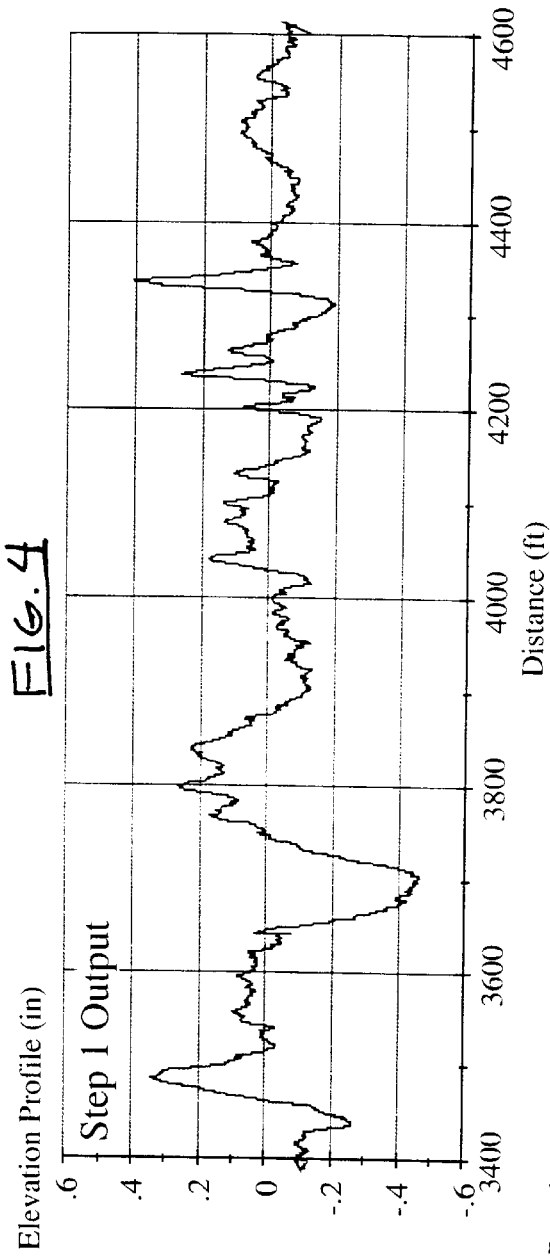
FIG. 4 is an elevation profile of a segment of pavement using a profiler.

The method of the present invention begins by measuring an elevation profile of a segment of pavement as seen in FIG. 4, with an ASTM Class I or Class II profiler. This can be accomplished with an inertial profiler, a rod and level, or an inclinometer-based profiling device. A profiler refers to any device that can measure road elevation along two longitudinal tracks (in the direction of travel) in a given lane wherein the output is provided at a constant distance interval. The elevation profile provides a raising and lowering the pavement with respect to a datum or origin over a distance traveled.

Figure 5:
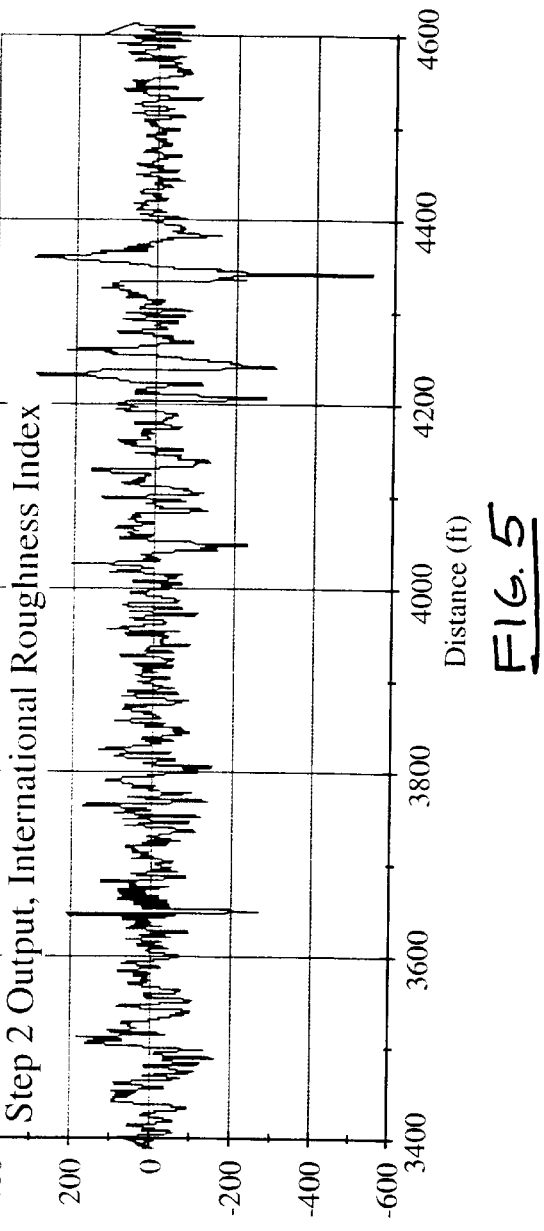
FIG. 5 is the profile shown in FIG. 4 converted to a roughness profile.

A roughness profile (as seen in FIG. 5) is then created by filtering the elevational profile, as seen in FIG. 4, using an algorithm of a known roughness index. The roughness index may include the International Roughness Index, Ride Number, and Ride Quality Index. The algorithms corresponding to these roughness indices are well-known to those skilled in the art. However, it is recommended that the sample intervals for creating the elevation profile should be specific to the type of roughness index utilized. For example, the recommended sample interval for the International Roughness Index or the Half Car Index should be three inches or less, and the profiling device must be valid in the range of wavelengths from 4 to 120 feet. If the roughness index is the Ride Number, the recommended sample interval is two inches or less, and the profiling device must be valid in the range of wavelengths from 1 to 50 feet. If the roughness index is the Michigan Ride Quality Index, the recommended sample interval is two inches or less, and the profiling device must be valid in a range of wavelengths from 1 to 70 feet. As previously provided, the purpose of the roughness index is to provide a profile that corresponds to the roughness of the ride in which a vehicle driver would realize when driving over the pavement.

Figure 6:
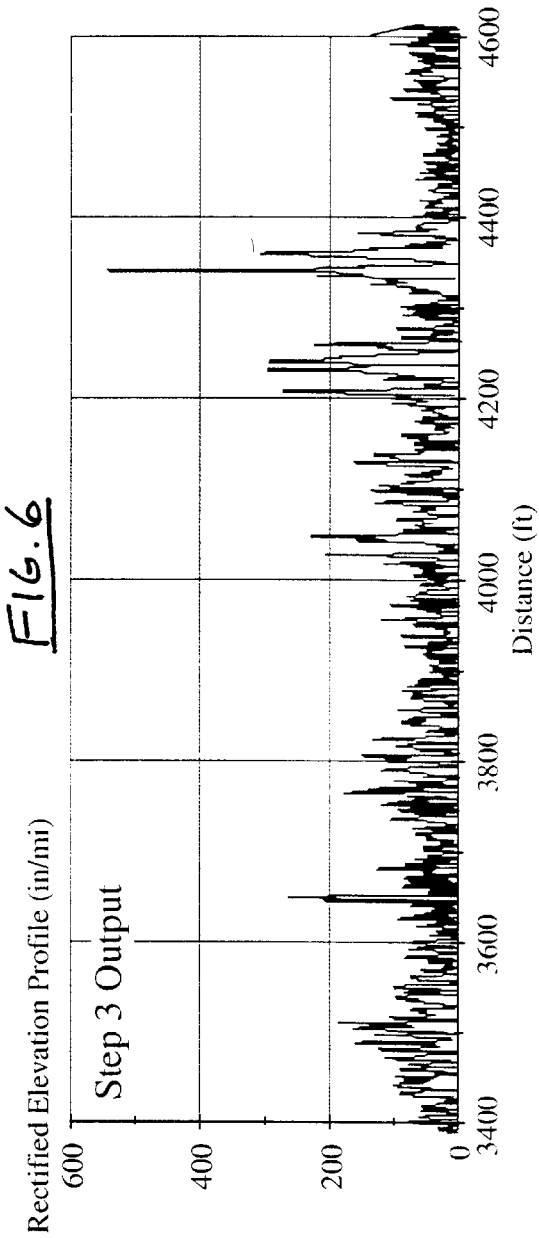
FIG. 6 is a rectified elevation profile of the roughness profile shown in FIG. 5.
Figure 7:
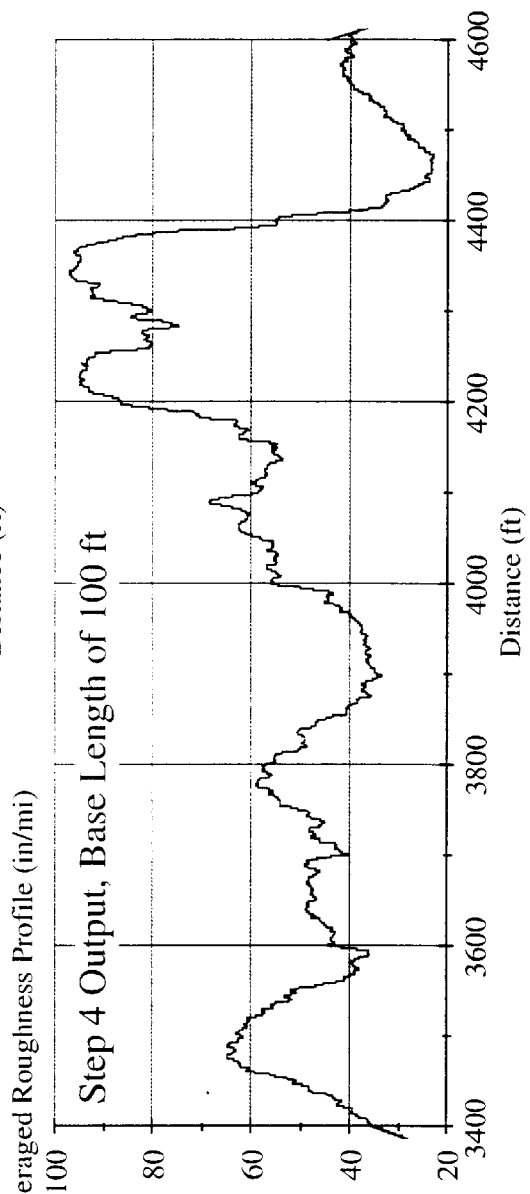
FIG. 7 is an average roughness profile of the rectified elevation profile shown in FIG. 6.

As seen in FIG. 6, a rectified elevation profile is created by taking the absolute value of every point in the roughness profile. A moving average filter is then applied to the rectified elevation profile to create an average roughness profile, as shown in FIG. 7. Although the process works when the base length is between 10 to 100 feet, the method works best when the moving average is between 25 to 50 feet.

A roughness limit is then applied to the average roughness profile, as seen in FIG. 8. The average roughness limit is a predetermined value that is typically specified in the pavement specifications of a project. Portions of the average roughness profile that exceeds the roughness limit are referred to as defective segments. The defective segments are considered too rough as they remain outside of the pavement specifications.

In order to determine whether a grinding operation would correct the roughness created by the defective segments, an algorithm is utilized to simulate the grinding of these defective segments. The grinding simulation uses the elevation profile shown in FIG. 4 as input to the algorithm and provides a modified elevation profile as output, as seen in FIG. 9. The detail of the algorithm for simulating the grinding operation will be described later, however, it is important to note that the grinding simulation is dependent on the configuration of the grinder, and therefore, different grinder types may provide different modified elevation profiles. Therefore, a user may wish to run different simulations on different grinders in order to determine the most effective grinder for certain elevation profiles.

Once the modified elevation profile is created, the modified elevation profile is then applied to the steps previously described in FIGS. 5–7 to obtain a modified average roughness profile, as shown in FIG. 10. The effect of the grinding simulation is then exhibited, by comparing the modified average roughness profile to the average roughness profile. In addition, the modified average roughness profile may then be compared to the roughness limit shown as the appropriate horizontal line, in FIG. 10. By evaluating these profiles, the user can determine what effect the grinder will have on the roughness areas of the pavement as well as specifically determine what areas need be ground.

To simulate a pavement grinder, the grinding, simulation requires a single track longitudinal road profile as input data and a single track (modified) longitudinal road profile as the output. The grinder simulation can be used in a virtual trial and error procedure to derive the instructions needed for grinder head control, such as the depth of the grinder head. A Target model 3806 grinder was used in the validation of this method, but the method can be applied to other popular grinder models, such as the Cushion Cut DC 390 and PC 5000 grinders.

Before performing the grinding simulation, certain preliminary calculations and parameters must be established. In considering the original elevation profile, the elevation shall be represented as a function of the longitudinal distance as represented by $P_o(X)$ where X is the longitudinal distance. If the supporting wheels of the grinder have truck tires on them, the elevation profile is smoothed out by applying a moving average that has a base length equal to the contact patch of the grinder tires, and thus, the average profile will be referred to as $P_s(X)$. For cushion cut grinders, it is recommended that the base length of the moving average filter be 12 inches. This is needed to represent the enveloping of the rear truck tires.

The grinding simulation also calculates the elevation profile after grinding. The elevation profile after grinding is represented by G (X) wherein X is the longitudinal distance. In all locations where the grinder is not operating, such as the section or profile ahead of the grinding starting point, G (X) is equal to $P_n$ (X).

Since the grinder has wheels that follow the profile of the pavement, the relationship of the grinding head relative to the wheels of the grinder must be determined. As seen in FIGS. 11–12, the average elevation of the front and rear set of tandem wheels of the grinder may be represented as a function of the longitudinal position X, as shown in the following formulas:

$$H_f = 0.5 \cdot (P_s(X+X_{f1}) + P_s(X+X_{f2}))$$

and $$H_r = 0.5 \cdot (P_s(X+X_{r1}) + P_s(X+X_{r2}))$$

where $H_f$ is the average elevation of the front set of tandem wheels of the grinder, $H_r$ is the average elevation of the rear set of tandem wheels of the grinder, P is the elevation profile, $X_{f1}$ is the longitudinal position of the first wheel of the front set of tandem wheels of the grinder, $X_{f2}$ is the longitudinal position of the second wheel of the front set of tandem wheels of the grinder, $X_{r1}$ is the longitudinal position of the first wheel of the rear set of tandem wheels of the grinder, and $X_{r2}$ is the longitudinal position of the second wheel of the rear set of tandem wheels of the grinder. If either the front or rear set of tandem wheels of the grinder only contain one axle, then the profile elevation at the single wheel longitudinal position should be used as the wheel set elevation. In addition, $P_s$ should be substituted for $P_o$ for any of the wheels that have truck tires.

The elevation of the grinder reference plane at the position of the grinder may be calculated by the following formula:

$$H_{ref} = ((L_r \cdot H_f) + (L_f H_r)) \div (L_r + L_f)$$

where $L_r$ is the distance from the grinding head to the center of the rear set of tandem wheels of the grinder, $L_f$ is the distance from the grinding head to the center of the front set of tandem wheels of the grinder, and $H_{ref}$ is the elevation of the grinder reference plane at the position of the grinding head.

The elevation of the grinder head at the point in which the simulation begins is the difference between the elevation profile at that point, minus the elevation of the grinder reference plane as represented by $$Z = P(X) - H_{ref}$$

The value Z is the difference between the position the grinding head takes on level ground and the elevation profile at that point. This is computed by taking the average of the profile P (X) under all the wheels ahead of the grinding, and then taking the average of the profile P (X) under all of the wheels behind the grinding head. The weighted average of these two values is calculated, and the value of the profile directly under the grinding head is subtracted therefrom. The value of Z is then maintained as a constant.

Simulation begins by stepping the grinder forward by incrementing the value of X at a sample interval over the entire area of interest. When the grinding head protrudes beneath the original elevation profile at the location of the grinding head, grinding of the elevation profile occurs, and the protrusion of the grinder is subtracted from the original elevation profile P (X) to establish the ground elevation profile G (X). If the grinder does not protrude beneath the original profile, then no grinding has occurred, and the original elevation profile P (X) value is simply copied into the ground elevation profile G (X). In determining these calculations, the values of $H_f$ and $H_r$ (i.e., the average elevation of the tandem wheels of the grinder), are recalculated for each interval. However, $H_r$ is now calculated using the following formula:

$$H_r = 0.5 \cdot (G(X+X_{r1}) + G(X+X_{r2}))$$

wherein G (X) is the elevation of the ground elevation profile. This occurs for $H_r$ because the grinding head has passed over the elevation profile for which the rear tandem wheels of the grinder contact.

It should be noted that if the rear tandem wheels of the grinder have a track that is wider than the grinding head, then the original, unground elevation profile should be utilized to compute the reference height. If the logistics of the grinding require that the wheels on one side of the grinder are on ground pavement and the wheels on the other side are on unground pavement, then the following formula should be utilized to compute the average elevation of the rear set of wheels:

$$H_r = 0.25 \cdot (G(X+X_{r1}) + G(X+X_{r2})) + 0.25 \cdot (P(X+X_{r1}) + P(X+X_{r2}))$$

After having determined the average elevation of the wheels of the grinder during the grinding simulation, the elevation of the grinder reference plane corresponding to the grinder location is determined through the computation:

$$H_{grndref} = ((L_r \cdot H_f) + (L_f H_r)) \div (L_r + L_f)$$

The profile at the current longitudinal position of the grinding head X must be adjusted to account for the depth of the grinding head. Therefore, if $$P(X) \leq (H_{grndref} + Z), \text{ then } G(X) = P(X)$$

which means that no adjustment is needed to the elevation profile. However if $$P(X) > (H_{grndref} + Z), \text{ then } G(X) = (H_{grndref} + Z)$$

The incrementing of the grinder simulation is continued along the longitudinal position X until the simulated grinding area is completely covered. The new elevation profile output values G (X) are used to establish a modified elevation profile, as shown in FIG. 9. The difference between the elevation profiles before and after grinding simulation is shown by the different lines. The modified elevation profile may then be converted to a modified average roughness profile, as seen in FIG. 10, in order to evaluate whether the areas that exceed the roughness limit are brought within compliance. The different lines of the modified average roughness profile show the difference between the elevation profiles before and after simulation grinding. By evaluating the modified average roughness profiles, a user may apply the grinder only where necessary, for example, between 4200–4400 feet. By only grinding in those areas that require grinding, unnecessary and inefficient grinding operations are eliminated, thereby reducing cost and increasing efficiency.

While the invention has been described in connection with what is presently considered to be the most practical and preferred embodiment, it is to be understood that the invention is not to be limited to those disclosed embodiments, but to the contrary, it is intended to cover various modifications, equivalents and arrangements included within the spirit and scope of the appended claims. The scope is to be accorded the broadest interpretation so as to encompass all such modifications and equivalent structures as is permitted under the law.

What is claimed is:

1. A method for correcting roughness of pavement, comprising the steps of:
   establishing an elevation profile of the pavement that indicates defective segments therein;
   simulating a grinder over the defective segments to establish a modified elevation profile of the pavement; and
   grinding the defective segments of the pavement in response to the modified elevation profile established by the grinder simulation to correct the defective segments.

2. The method stated in claim 1, wherein said step of establishing an elevation profile further comprises the steps of:
   measuring an elevation profile of the pavement;
   converting the elevation profile to an averaged roughness profile; and
   identifying defective segments as areas of the averaged roughness profile that exceed a predetermined value.

3. The method stated in claim 1, further comprising the steps of:
   converting the modified elevation profile to a modified roughness profile.

4. The method stated in claim 3, further comprising the steps of:
   identifying corrected defective segments as defective segments in the roughness profile that are no longer defective segments in the modified roughness profile.

5. The method stated in claim 1, wherein said steps of simulating a grinder further comprise the steps of:
   calculating the elevation of a grinder reference plane at the position of a grinder head; and
   calculating the simulated position of the grinder head by determining the difference between the grinder reference plane and the elevation profile.

6. The method stated in claim 5, further comprising the steps of:
   incrementally simulating the grinder forward;
   calculating the elevation of the grinder reference plane corresponding to the grinder location; and
   adjusting the elevation profile at the current longitudinal position of the grinding head to account for the depth of the grinding head.

7. A method for correcting roughness of pavement, comprising the steps of:
   establishing an elevation profile of the pavement that indicates defective segments;
   simulating a grinder over the defective segments to provide a modified elevation profile;
   converting the modified elevation profile to a modified roughness profile;
   identifying corrected defective segments as defective segments in the roughness profile that are no longer defective segments in the modified roughness profile; and
   grinding the defective segments of the pavement in response to the modified elevation profile established by the grinder simulation in order to obtain corrected defective segments in the pavement.

8. The method stated in claim 7, wherein said step of establishing an elevation profile further comprises the steps of:
   measuring an elevation profile of the pavement;
   converting the elevation profile to an averaged roughness profile; and
   identifying defective segments as areas of the roughness profile that exceed a predetermined value.

9. The method stated in claim 7, wherein said step of simulating a grinder further comprises the steps of:
   calculating the elevation of a grinder reference plane at the position of a grinder head; and
   calculating the simulated position of the grinder head by determining the distance between the grinder reference plane and the elevation profile.

10. The method stated in claim 9, further comprising the steps of:
    incrementally stimulating the grinder forward;
    calculating the elevation of the grinder reference plane corresponding to the grinder location; and
    adjusting the elevation profile at the current longitudinal position of the grinding head to account for the depth of the grinding head.

11. A method for correcting roughness of the pavement, comprising the steps of:
    measuring an elevation profile of the pavement;
    converting the elevation profile to an averaged roughness profile;
    identifying defective segments as areas of the roughness profile that exceed a predetermined value;
    simulating a grinder over the defective segments to provide a modified elevation profile;
    converting the modified elevation profile to a modified roughness profile;
    identifying corrected defective segments as defective segments in the roughness profile that are no longer defective segments in the modified roughness profile; and
    grinding the defective segments in the pavement in response to the modified elevation profile established by the grinder simulation in order to correct defective segments in the pavement.

12. The method stated in claim 11, wherein said step of simulating a grinder further comprises the steps of:
    calculating the elevation of a grinder reference plane at the position of a grinder head;
    calculating the simulated position of the grinder head by determining the distance between the grinder reference plane and the elevation profile;
    incrementally simulating the grinder forward;
    calculating the elevation of the grinder reference plane corresponding to the grinder location; and
    adjusting the profile of the current longitudinal position of the grinding head to account for the depth of the grinding head.

13. The method stated in claim 12, wherein the step of calculating the elevation of a grinder reference plane further comprises the steps of:
    calculating the average elevation of a front set of wheels of the grinder;
    calculating the average elevation of a rear set of wheels of the grinder; and calculating the elevation of the grinder reference plane at the position of the grinding head.

14. The method stated in claim 13, further comprising the steps of:

calculating the average elevation of the front set of wheels of the grinder through the formula $H_f=0.5 \cdot (P(X+X_{f1})+P(X+X_{f2}))$ where $H_f$ is the average elevation of the front set of wheels of the grinder, P is the profile elevation, X is the longitudinal distance of the point being ground, $X_{f1}$ is the elevation of the first wheel of the front set of wheels on the grinder, and $X_{f2}$ is the elevation of the second wheel of the front set of wheels of the grinder;

calculating the average elevation of the rear set of tandem wheels through the formula $H_r=0.5 \cdot (P(X+X_{r1})+P(X+X_{r2}))$ wherein $H_r$ is the average elevation of the rear set of tandem wheels, P is the profile elevation, and X is the longitudinal distance of the point being ground, $X_{r1}$ is the elevation of the first wheel of the rear set of wheels of the grinder, and $X_{r2}$ is the elevation of the second wheel of the rear set of wheels of the grinder; and calculating the elevation of the grinder reference plane at the position of the grinding head through the formula $H_{ref}=((L_r \cdot H_f)+(L_f \cdot H_r))\div(L_r+L_f)$ wherein $H_{ref}$ equals the elevation of the grinder reference plane at the position of the grinding head, $L_r$ is the longitudinal position of the rear set of wheels to the grinding head, and $L_f$ is the longitudinal position of the front wheels to the grinding head.

15. The method stated in claim 12, wherein the step of calculating the simulated position of the grinder head further comprises the steps of:

calculating the height of the grinding head through the formula $Z=P(X)-H_{ref}$ wherein Z is the height of the grinding head, P(X) is the elevation profile at point X, and $H_{ref}$ is the elevation of the grinding reference plane.

16. The method stated in claim 12, wherein the step of calculating the elevation of the grinder reference plane at a particular grinder location further comprises the steps of:

calculating the average elevation of the front set of wheels of the grinder;

calculating the average elevation of the rear set of the wheels of the grinder after grinding; and calculating the average elevation of the grinder reference plane after grinding.

17. The method stated in claim 16, further comprising the steps of:

calculating the average elevation of the front set of wheels of the grinder through the formula $H_f=0.5(P(X+X_{f1})+P(X+X_{f2}))$ wherein $H_f$ equals the average elevation of the front set of the wheels of the grinder, P equals the elevation profile, X equals the longitudinal distance of the grinder, $X_{f1}$ equals the longitudinal position of the first wheel of the front set of wheels, and $X_{f2}$ equals the second wheel of the front set of wheels;

calculating the average elevation of the rear set of wheels of the grinder after grinding through the formula $H_r=0.5(G(X+X_{r1})+G(X+X_{r2}))$ wherein $H_f$ equals the average elevation of the first set of wheels of the grinder after grinding, G is the profile elevation after grinding, X is the longitudinal position of the first wheel in the rear set of wheels, and $X_{r2}$ is the longitudinal distance of the second wheel of the rear set of wheels; and calculating the average elevation of the grinder reference planes at the location of the grinder through the formula $H_{grndref}=((L_r \cdot H_f)+(L_f \cdot H_r))\div(L_r+L_f)$ wherein $H_{grndref}$ equals the elevation of the grinder reference plane after grinding, $L_r$ equals the longitudinal distance from the grinder head to the rear set of wheels, and $L_f$ equals the longitudinal distance between the grinder head and the front set of wheels.

18. The method stated in claim 12, wherein the step of adjusting the profile further comprises the steps of:

maintaining the profile elevation at position X if P(X) is less than or equal to $(H_{gref}+Z)$; and adjusting the profile elevation at position X if P(X) is greater than $(H_{grndref}+Z)$ by adjusting G(X) to equal $(H_{grndref}+Z)$.

\* \* \* \* \*

UNITED STATES PATENT AND TRADEMARK OFFICE
CERTIFICATE OF CORRECTION

PATENT NO. : 6,682,261 B1
DATED : January 27, 2004
INVENTOR(S) : Karamihas et al.

It is certified that error appears in the above-identified patent and that said Letters Patent is hereby corrected as shown below:

Column 4,
Line 47, please delete "grinding, simulation" and insert -- grinding simulation --;

Column 5,
Line 9, please delete "$P_n (X)$" and insert -- $P_o (X)$ --;

Column 6,
Line 43, please delete "$\leqq$" and insert -- $\leq$ --.

Column 10,
Line 17, please delete "$H_f$" and insert -- $H_r$ --.

Signed and Sealed this

Sixth Day of April, 2004

JON W. DUDAS
*Acting Director of the United States Patent and Trademark Office*